US012809492B2

(12) United States Patent
Seo et al.

(10) Patent No.: US 12,809,492 B2
(45) Date of Patent: Nov. 24, 2026

(54) ELECTRONIC DEVICE WHICH DISPLAYS CONTROLLER, AND OPERATING METHOD THEREOF

(71) Applicant: Samsung Electronics Co., Ltd., Suwon-si (KR)

(72) Inventors: Kyunghwa Seo, Suwon-si (KR); Jiwon Kim, Suwon-si (KR); Chaekyung Lee, Suwon-si (KR); Seungyong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/051,706

(22) Filed: Feb. 12, 2025

(65) Prior Publication Data

US 2025/0181206 A1 Jun. 5, 2025

Related U.S. Application Data

(63) Continuation of application No. PCT/KR2023/013079, filed on Sep. 1, 2023.

(30) Foreign Application Priority Data

Sep. 19, 2022 (KR) ........................ 10-2022-0117755
Oct. 21, 2022 (KR) ........................ 10-2022-0136251

(51) Int. Cl.
*G06F 3/0481* (2022.01)
*G06F 3/041* (2006.01)
(Continued)

(52) U.S. Cl.
CPC .......... *G06F 3/0481* (2013.01); *G06F 3/0484* (2013.01); *H04M 1/0268* (2013.01); *H04M 1/72454* (2021.01); *G06F 3/041* (2013.01)

(58) Field of Classification Search
CPC ...... G06F 3/041; G06F 3/048; H04M 1/0268; H04M 1/72454
(Continued)

(56) References Cited

U.S. PATENT DOCUMENTS 10,635,292 B2 * 4/2020 Aurongzeb .............. G09G 5/00
2010/0182265 A1 7/2010 Kim et al.
(Continued)

FOREIGN PATENT DOCUMENTS

CN 111263005 A 6/2020
EP 3 996 358 A1 5/2022
(Continued)

OTHER PUBLICATIONS

International Search Report dated Nov. 28, 2023, issued in International Application No. PCT/KR2023/013079.

*Primary Examiner* — Kwin Xie
(74) *Attorney, Agent, or Firm* — Jefferson IP Law, LLP

(57) ABSTRACT

An electronic device is provided. The electronic device includes a display bendable to be divided into a first area and a second area, a sensor circuit configured to generate detection data related to a bending state of the display and a behavior state of the electronic device, memory storing one or more computer programs, and one or more processors communicatively coupled to the display, the sensor circuit, and the memory, wherein the one or more computer programs include computer-executable instructions that, when executed by the one or more processors individually or collectively, cause the electronic device to obtain the generated detection data related to the bending state of the display and the behavior state of the electronic device from the sensor circuit, determine whether a condition related to screen display of the display is met, based on the obtained detection data, and display a screen related to content of an executed application in the first area and a screen related to (Continued)

manipulation of the application in the second area when the condition is met.

22 Claims, 13 Drawing Sheets

(51) Int. Cl.

*G06F 3/0484* (2022.01)
*H04M 1/02* (2006.01)
*H04M 1/72454* (2021.01)

(58) Field of Classification Search
USPC .................................................. 345/173–174
See application file for complete search history.

(56) References Cited

U.S. PATENT DOCUMENTS

| | | | | |
|---|---|---|---|---|
| 2013/0176248 | A1 | 7/2013 | Shin et al. | |
| 2013/0321340 | A1* | 12/2013 | Seo | G06F 3/0481 345/174 |
| 2014/0101575 | A1 | 4/2014 | Kwak et al. | |
| 2014/0101576 | A1* | 4/2014 | Kwak | G06F 1/1618 715/761 |
| 2014/0337771 | A1 | 11/2014 | Jung et al. | |
| 2016/0026219 | A1* | 1/2016 | Kim | H04M 1/0245 345/173 |
| 2016/0098063 | A1 | 4/2016 | Lee et al. | |
| 2016/0132074 | A1 | 5/2016 | Kim et al. | |
| 2019/0286273 | A1 | 9/2019 | Kim et al. | |
| 2020/0175945 | A1* | 6/2020 | Chen | G09G 5/14 |
| 2021/0357169 | A1 | 11/2021 | Hulbert et al. | |
| 2022/0215815 | A1 | 7/2022 | Kim et al. | |
| 2022/0394189 | A1* | 12/2022 | Choi | H04N 23/632 |
| 2023/0044497 | A1 | 2/2023 | Zhang et al. | |
| 2023/0262158 | A1 | 8/2023 | Yu et al. | |

FOREIGN PATENT DOCUMENTS

| | | | |
|---|---|---|---|
| KR | 10-2010-0082451 | 7/2010 | |
| KR | 10-2013-0080937 | 7/2013 | |
| KR | 10-2014-0046345 | 4/2014 | |
| KR | 20140046345 A * | 4/2014 | G06F 3/0481 |
| KR | 10-2014-0133269 | 11/2014 | |
| KR | 10-2016-0055646 | 5/2016 | |
| KR | 10-2083918 | 3/2020 | |
| KR | 10-2021-0035447 | 4/2021 | |
| KR | 10-2022-0061479 | 5/2022 | |

* cited by examiner

ELECTRONIC DEVICE WHICH DISPLAYS CONTROLLER, AND OPERATING METHOD THEREOF

CROSS-REFERENCE TO RELATED APPLICATION(S)

This application is a continuation application, claiming priority under § 365(c), of an International application No. PCT/KR2023/013079, filed on Sep. 1, 2023, which is based on and claims the benefit of a Korean patent application number 10-2022-0117755, filed on Sep. 19, 2022, in the Korean Intellectual Property Office, and of a Korean patent application number 10-2022-0136251, filed on Oct. 21, 2022, in the Korean Intellectual Property Office, the disclosure of each of which is incorporated by reference herein in its entirety.

BACKGROUND

1. Field

The disclosure relates to a technology that displays an optimized controller according to a specific condition of an electronic device.

2. Description of Related Art

Various types of flexible electronic devices have been developed thanks to the development of electronic technology. Such a flexible electronic device may secure portability while providing a larger display. For example, as the flexible electronic device is transformable by the user applying force, it may provide a foldable, bendable, or rollable display.

An electronic device including a folding-type flexible display may display a screen on the displays (or display areas) in various sizes. For example, when an electronic device folds in in half, the user may view the screen (e.g., content screen) in a hand-free state. In the folded state, the screen may be displayed only through the internal display of the electronic device or, for a specific application (e.g., camera application), the screen may be displayed through the external display by user settings.

However, an electronic device including a plurality of foldable displays may display content in various display areas. Therefore, if the display is changed adaptively depending on the user's position to display content, the usability of the electronic device may be increased.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a technology that displays an optimized controller according to a specific condition of an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display bendable to be divided into a first area and a second area, first sensor circuitry configured to generate first detection data related to a bending state of the display and second sensor circuitry configured to generate second detection data related to a behavior state of the electronic device, memory storing one or more computer programs, and one or more processors communicatively coupled to the display, the first sensor circuitry, the second sensor circuitry, and the memory, wherein the one or more computer programs include computer-executable instructions that, when executed by the one or more processors individually or collectively, cause the electronic device to obtain the first detection data related to the bending state of the display from the first sensor circuitry and the second detection data related to the behavior state of the electronic device from the second sensor circuitry, determine whether a condition related to screen display of the display is met, based on the first detection data and the second detection data, and display a screen related to a content of an executed application in the first area and a screen related to manipulation of the application in the second area when the condition is met.

In accordance with another aspect of the disclosure, a method for operating an electronic device is provided. The method includes obtaining first detection data related to a bending state of a display bendable to be divided into a first area and a second area from first sensor circuitry and second detection data related to a behavior state of the electronic device from second sensor circuitry, determining whether a condition related to screen display of the display is met, based on the first detection data and the second detection data, and displaying a screen related to a content of an executed application in the first area and a screen related to manipulation of the application in the second area when the condition is met.

In accordance with another aspect of the disclosure, one or more non-transitory, computer-readable storage media storing one or more programs including computer-executable instructions that, when executed by one or more processors of an electronic device individually or collectively, cause the electronic device to perform operations are provided. The operations include obtaining first detection data related to a bending state of a display bendable to be divided into a first area and a second area from first sensor circuitry and second detection data related to a behavior state of the electronic device from second sensor circuitry, determining whether a condition related to screen display of the display is met, based on the first detection data and the second detection data, and displaying a screen related to a content of an executed application in the first area and a screen related to manipulation of the application in the second area when the condition is met.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
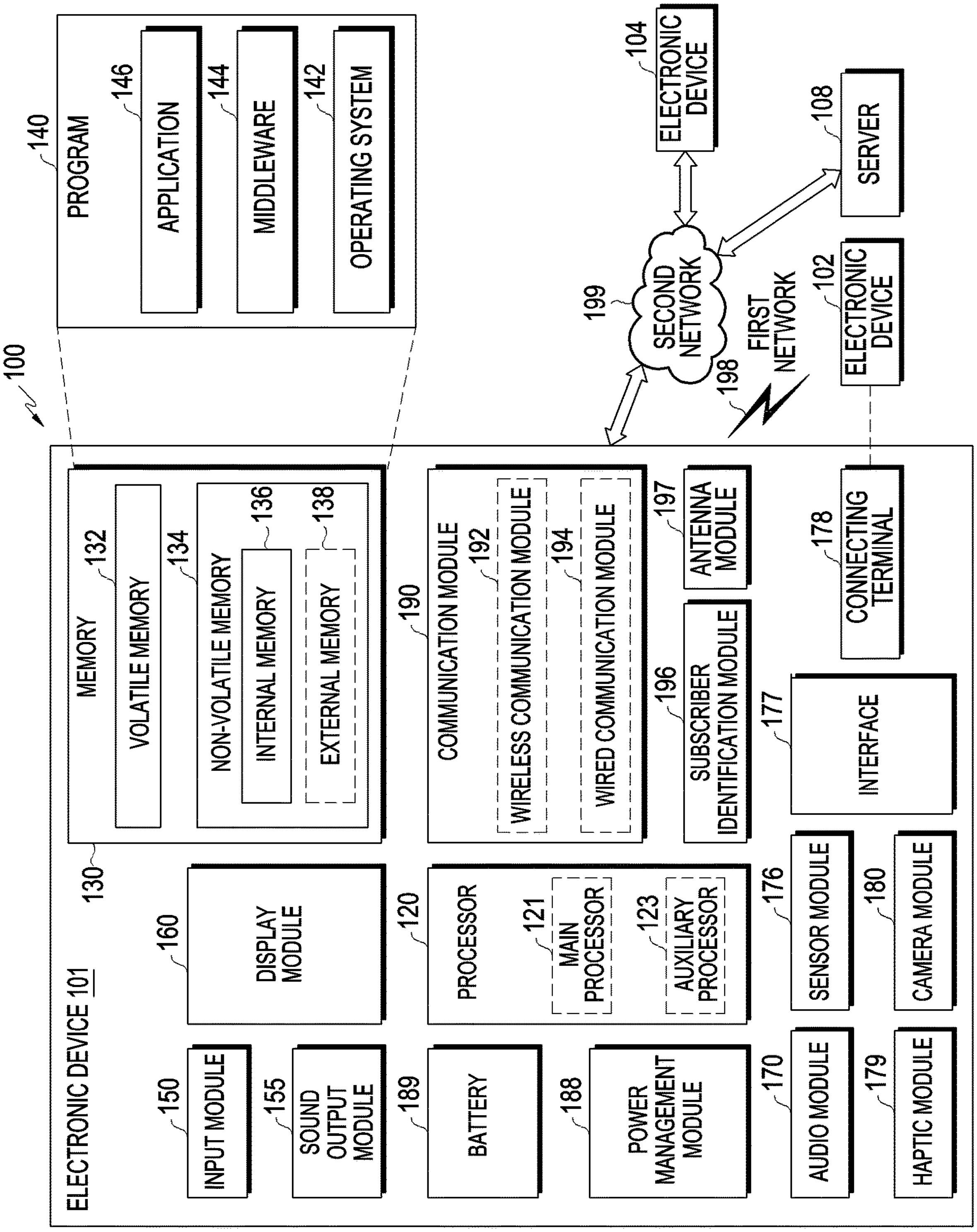
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor

123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

Figure 2C:
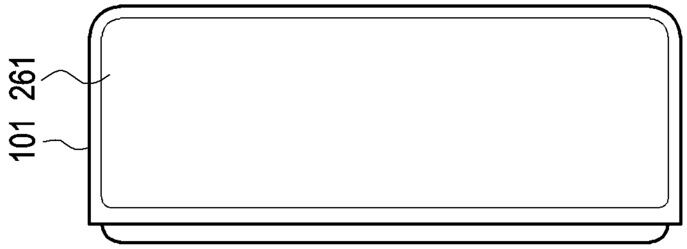
FIGS. 2A, 2B, and 2C are views illustrating an unfolded state and a folded state of an electronic device according to various embodiments of the disclosure.
Figure 2B:
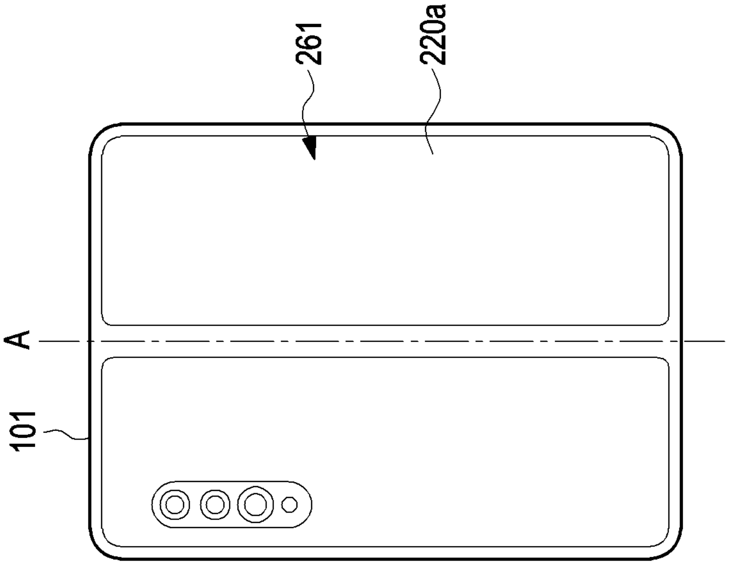
Figure 2A:
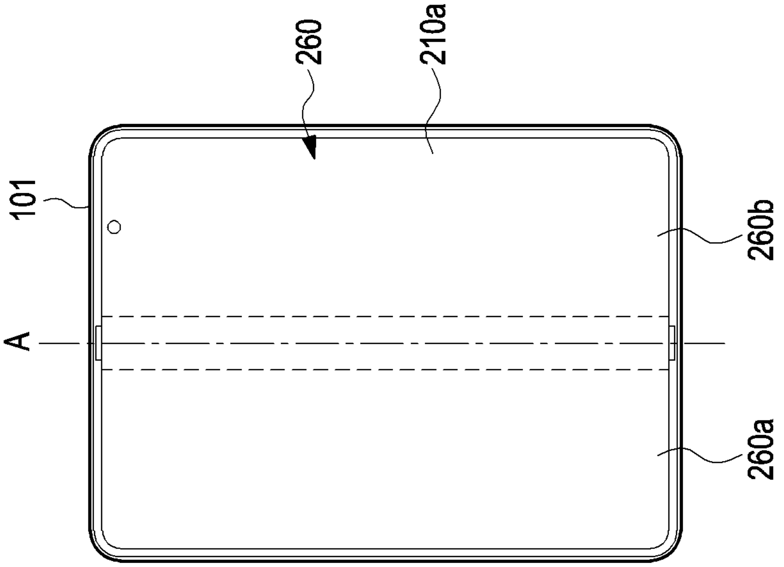

FIGS. 2A, 2B, and 2C are views illustrating an unfolded state and a folded state of an electronic device 101 according to various embodiments of the disclosure.

Referring to FIGS. 2A to 2C, in an embodiment, an electronic device 101 may include a foldable housing and a flexible or foldable display 260 disposed in a space formed by the foldable housing. The foldable housing may have a substantially symmetrical shape about a folding axis (e.g., axis A). According to an embodiment, the surface where a first flexible display 260 is disposed may be defined as a first surface 210*a* of the electronic device 101, and the surface opposite to the first surface 210*a* may be defined as a second surface 220*a*. Here, the surface where the first display 260 is disposed may be defined as a first surface 210*a* or front surface of the electronic device 101, and the surface opposite to the front surface may be defined as a second surface 220*a* or rear surface of the electronic device 101.

Referring to FIG. 2A, the first display 260 may be formed to occupy the entire first surface 210*a* of the electronic device 101 and, as shown in FIG. 2B, the second display 261 may be formed to occupy at least a portion of the second surface 220*a*. In this case, the first display 260 may pivot through a separate hinge module, and the second display 261 may be fixed to the housing. For example, the hinge structure may be configured to be folded or unfolded inward or outward. For example, a free stop hinge may maintain the folded state of the electronic device 101 at various angles.

For example, the second display 261 may be disposed on any one of a pair of housings disposed on two opposite sides with respect to a folding axis (e.g., axis A). According to an embodiment, the first display 260 may mean a flexible display at least a portion of which may be transformed into a flat or curved surface. The first display 260 may include a first area (or first display area) 260*a* disposed on one side of the folding axis (e.g., axis A) and a second area (or second display area) 260*b* disposed on the opposite side of the folding axis.

For example, when the electronic device 101 is in an unfolded state (e.g., a flat state), the surface of the first area 260*a* and the surface of the second area 260*b* may form 180 degrees therebetween and face in the same direction (e.g., the forward direction of the electronic device 101).

Referring to FIG. 2C, when the electronic device 101 is in a folded state, the surface of the first area 260*a* and the surface of the second area 260*b* of the first display 260 may face each other while forming a narrow angle (e.g., an angle between 0 and 10 degrees) therebetween. According to an embodiment, in the folded state of the electronic device 101, the second display 261 may be disposed on any one of the pair of housings disposed on two opposite sides of the folding axis (e.g., axis A), but this is an example, and the second display 261 may configure most of the rear surface 220*a* depending on the structure or function. For example, the electronic device 101 may include the second display 261 at least a portion of which is visually exposed through the rear cover. Accordingly, it should be noted that the size and shape of the first display 260 and the second display 261 are not limited thereto. Further, the segmentation of the first display 260 as shown in FIG. 2A is merely an example, and the first display 260 may be divided into a plurality of (e.g., four or more, or two) areas depending on the structure or function.

Figure 3:
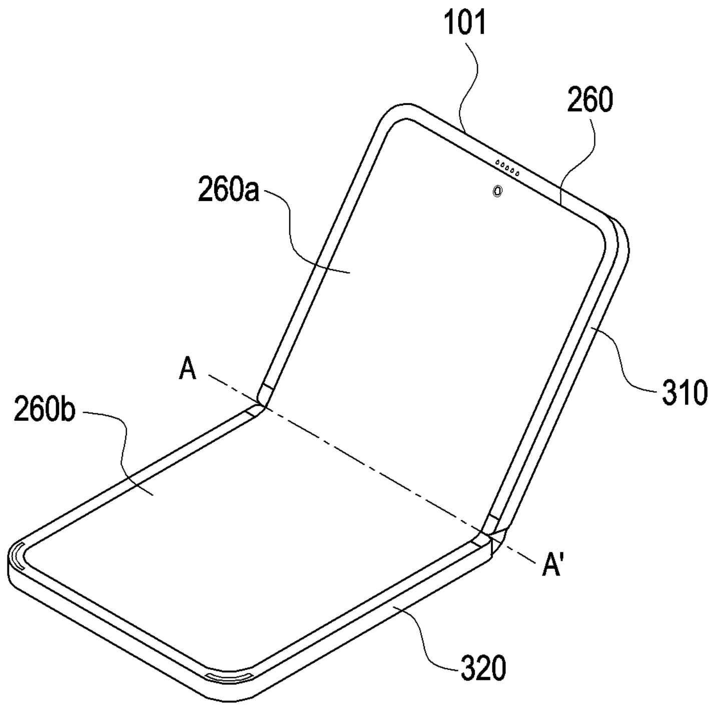
FIG. 3 is a view illustrating a partially folded state of an electronic device according to an embodiment of the disclosure.
Figure 4:
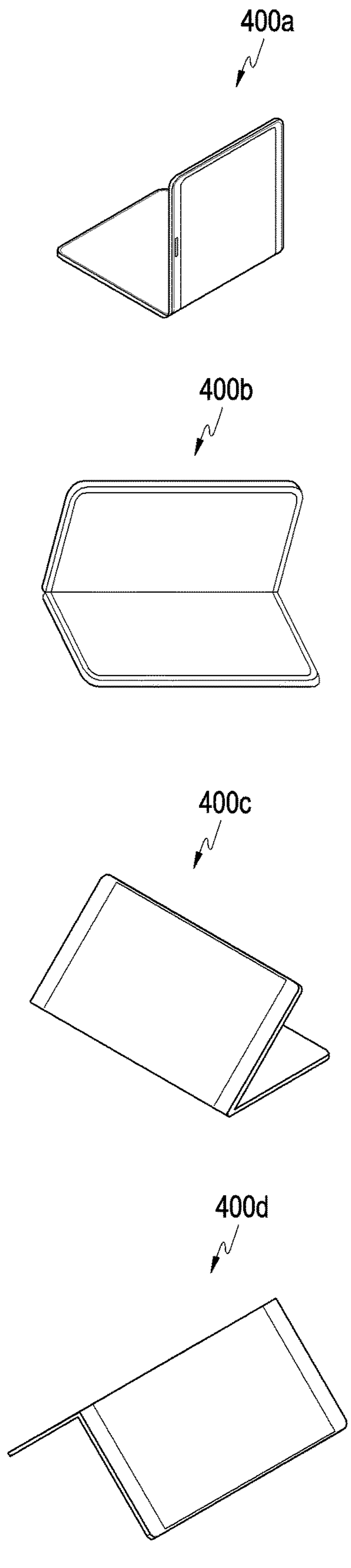
FIG. 4 is a perspective view illustrating various partially folded states of an electronic device according to an embodiment of the disclosure.

FIG. 3 is a view illustrating a partially folded state of an electronic device 101 according to an embodiment of the disclosure. FIG. 4 is a perspective view illustrating various partially folded states of an electronic device 101 according to an embodiment of the disclosure.

Referring to FIG. 3, the electronic device 101 may have a partially unfolded state based on the folding axis (e.g., A-A'). The electronic device 101 may have a state in which the second housing structure 310 is upright on a contact surface (e.g., floor or table) with the first housing structure 320 contacting the contact surface. As such, the electronic device 101 including a flexible display may fold or bent about one axis. According to an embodiment, in a partially folded state of the electronic device 101, the first display 260 may be divided into a first display area 260*a* and a second display area 260*b* vertically with respect to the folding axis. The first display area 260*a* corresponding to the upper side of the folding axis viewed by the user may be referred to as an upper area of the first display 260 (or internal display), and the second display area 260*b* corresponding to the lower side may be referred to as a lower area of the first display 260 (or internal display). At least one of the first display area 260*a* or the second display area 260*b* may include a front camera.

If the electronic device 101 shown in FIG. 3 becomes a state in which the first display 260 is partially folded, the display or display area shown to the user may be varied depending on the mounting state (or pose) as shown in FIG. 4.

The electronic device 101 may have various partially folded states 400*a*, 400*b*, 400*c*, and 400*d* as shown in FIG. 4. The electronic device 101 may have a state in which it stands with the electronic device 101 folding in in half like a compact shape. According to an embodiment, if the electronic device 101 is a state (or pose) as shown in 400*a* to 400*c* of FIG. 4, an on state may be maintained for at least one area (or one surface) of the first display (e.g., 260 of FIG. 2A), and the second display (e.g., 261 of FIG. 2B) may be turned off. In other words, in the partially folded state, either the first display or the second display may be in an on state, while the other may be in an off state. Further, according to an embodiment, as the electronic device 101 supports the surface where an angle is formed between the first housing structure (e.g., 320 of FIG. 3) and the second housing structure (e.g., 310 of FIG. 3) so that the side surfaces of the main bodies contact as shown in 400*d* of FIG. 4, an on state may be maintained for one area (or one surface) of the display, and the other area (or the other surface) may be turned off in the standing state 400*d* of the electronic device 101.

As described above, in a state in which the first display 260 is partially folded to separate the first display area (e.g., 260*a* of FIG. 3) and the second display area e.g., 260*b* of FIG. 3), the area exposed to the user, of the first display area and second display area, may be varied depending on the mounting state of the electronic device 101. Further, in the case of an electronic device 101 including a plurality of displays as shown in FIGS. 2A to 2C, the display exposed to the user, of the first display 260 and the second display 261, may be varied as well. Accordingly, if the display outputting images is determined according to the user's position, the usability of the electronic device may be increased.

In an embodiment, when the electronic device 101 including a plurality of displays outputs an image with at least a portion of the first display 260 folded, the electronic device 101 may adaptively change the display area to correspond to the user's position by identifying the user's position. Here, the state in which at least a portion of the display is folded may be referred to as a flex mode, and the folded state of the electronic device 101 may be maintained at various angles.

In this case, as the folding ratio of the electronic device, the electronic device may be folded in half with respect to the middle of the electronic device, but the folding ratio about the axis may also be implemented to differ.

Here, one axis may be preset or an arbitrary one. The axis being preset may mean that only a specific area (e.g., a partial area including the axis) of the flexible display of the electronic device 101 is bendable. On the other hand, the axis being arbitrary may mean that the entire area of the display of the electronic device 101 is bendable. Although FIGS. 2A to 2C, 3, and 4 illustrate that the electronic device 101 is folded in half about the axis passing through the axis of the electronic device 101, it will be appreciated by one of ordinary skill in the art that the position of the axis is not limited.

Further, in the following detailed description, the 'front surface' or 'rear surface' of the electronic device 101 may be mentioned. Regardless of the relative positions (e.g., folded state or unfolded state) of the first housing structure (e.g., 320 of FIG. 3) or second housing structure (e.g., 310 of FIG. 3), the surface where the first display 260 of FIG. 2A is disposed is defined as a 'front surface of the electronic device 101,' and the surface where the second display 261 facing opposite to the surface where the first display 260 is disposed is disposed is defined as a 'rear surface of the electronic device 101.' Further, the first display 260 may be referred to as an internal display, and the second display 260 opposite to the first display 260 may be referred to as an external display. According to an embodiment, a "configuration in which the electronic device 101 includes a plurality of displays" may be mentioned and, here, the "display" may mean a flexible display. For example, the first display 260 of FIG. 2A or 3 may mean a flexible display.

In the following description, the components easy to understand from the description of the above embodiments are denoted with or without the same reference numerals and their detailed description may be skipped. According to an embodiment of the disclosure, an electronic device 101 may be implemented by selectively combining configurations of different embodiments, and the configuration of one embodiment may be replaced by the configuration of another embodiment. However, it is noted that the disclosure is not limited to a specific drawing or embodiment.

Figure 5:
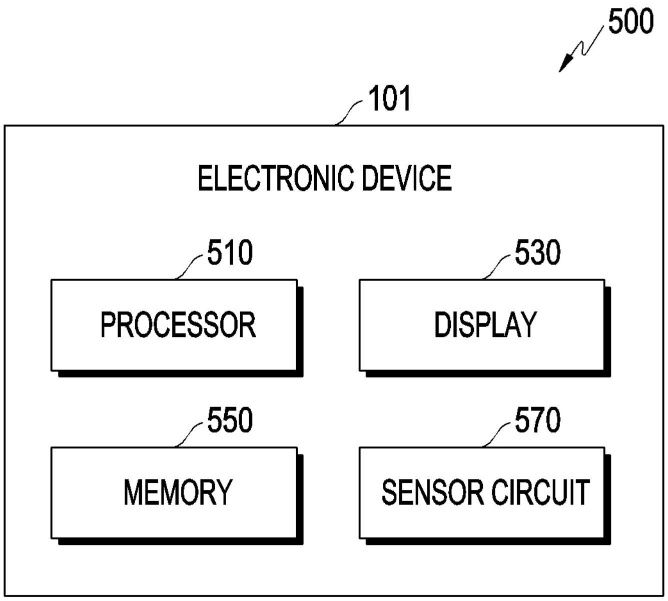
FIG. 5 is an internal block diagram illustrating an electronic device according to an embodiment of the disclosure.

FIG. 5 is a block diagram 500 illustrating an internal configuration of an electronic device according to an embodiment of the disclosure.

Referring to FIG. 5, an electronic device 101 according to an embodiment may include a processor 510 (e.g., the processor 120 of FIG. 1), memory 550 (e.g., the memory 130 of FIG. 1), a display 530 (e.g., the display module 160 of FIG. 1), a sensor 570 (e.g., the sensor module 176 of FIG. 1), and a communication module 590 (e.g., the communication module 190 of FIG. 1). Not all of the components of FIG. 5 are essential ones of the electronic device 101 but the electronic device 101 may be implemented with more or less than the components of FIG. 5.

In an embodiment, the display 530 may mean a flexible display bendable to be separated into a first area and a second area. According to an embodiment, the display 530 may include a first display 260 and a second display 261 as shown in FIGS. 2A to 2C. For example, as the first display 260 is at least partially bent, the first display 260 may be divided into a first area and a second area. According to an embodiment, the partially folded state (e.g., a flex mode) of the first display 260 may mean a state in which each of at least a portion of the first display 260 and at least a portion of the second display 261 is visually exposed to the outside.

In an embodiment, the sensor circuit 570 may include a sensor (e.g., a digital hall sensor or a magnetic sensor) for determining a bending state (e.g., an unfolded state, a folded state, and/or an intermediate state) and a folding angle of the display 260. In addition to the foregoing, the sensor circuit 570 may include a strain sensor that outputs a strain value used to indirectly measure the folding angle of the electronic device 101. In an embodiment, the sensor circuit 570 may measure an angle between the first area and the second area.

In an embodiment, the sensor circuit 570 may include a sensor (e.g., a gravity sensor (G sensor), a 6-axis sensor, or a gyro sensor) for determining the behavior state (e.g., a mounted state, a moving state, a rotating state, and/or a gripping state) of the electronic device 101. In an embodiment, the sensor circuit 570 may measure in which direction gravity acting on the electronic device 101 acts.

In an embodiment, the processor 510 may detect a physical state and/or a change in the physical state of the electronic device 101 based on detection data received from the sensor circuit 570. The processor 510 may detect (e.g., a folding event, an unfolding event) a change in the bending state (e.g., an unfolded state, a folded state, and/or a partially folded intermediate state). In an embodiment, the processor 510 may store a first lookup table in which a relationship between the strength of a magnetic force (or a change in magnetic force) detected by the sensor circuit 570 (e.g., a hall sensor) and an inclination angle is defined. The processor 510 may identify the bending state or the bending angle of the display 530 using the first lookup table.

In an embodiment, the processor 510 may identify the behavior state of the electronic device 101 based on detection data received from the sensor circuit 570. Based on the direction of gravity received from the sensor circuit 570 (e.g., a gravity sensor), the processor 510 may identify whether the electronic device 101 is in a horizontal state, a vertical state, an upward-facing state, or a downward-facing state, or whether the electronic device 101 is in a state in which rotation occurs or is mounted on a flat floor. For example, when a change in the direction of gravity received from the sensor circuit 570 (e.g., a gravity sensor) does not occur, the processor 510 may identify that the electronic device 101 is in a mounted state.

In an embodiment, the processor 510 may determine whether a condition related to screen display of the display 530 is met based on the detection data received from the sensor circuit 570. In an embodiment, when the display 530 is in a folded state and the electronic device 101 is in a mounted state, the processor 510 may determine that the condition related to screen display of the display 530 is met. In an embodiment, the fold state of the display 530 may be a state in which the display 530 is folded at a set angle or less as the angle between the first area and the second area, and may be a non-fully-unfolded state of the display 530. In an embodiment, the mounted state of the electronic device 101 may be a state in which the electronic device 101 is placed on a flat floor to be limited from rotation.

In an embodiment, the processor 510 may execute at least one application, and may visually output content corresponding to the application through the display 530. In an embodiment, the application may be, e.g., a video player application (video player), a music player application (audio player), a streaming application, an image viewer application, a timer application (timer), a recording application (recorder), a camera application (photo mode or video mode), or a gallery application (gallery).

For example, the processor 510 may output the image played through the display 530 in response to selection of a video-related application. Here, the image (or image data) may be the result of output by the application being currently executed and may include at least one of data objects, e.g., video data, audio data, or display information, created as the application is executed. Further, the image through the display 530 may be referred to as content or may also be referred to as data, screen data, or application execution screen related to the running application.

In an embodiment, the processor 510 may execute the application in response to a request for executing the application by the user. According to an embodiment, the processor 510 may display the image according to execution of the application on the display 530 in the partially folded state of the display 530. For example, the processor 510 may provide the image through any one or more of the plurality of displays according to the user settings.

Figure 6A:
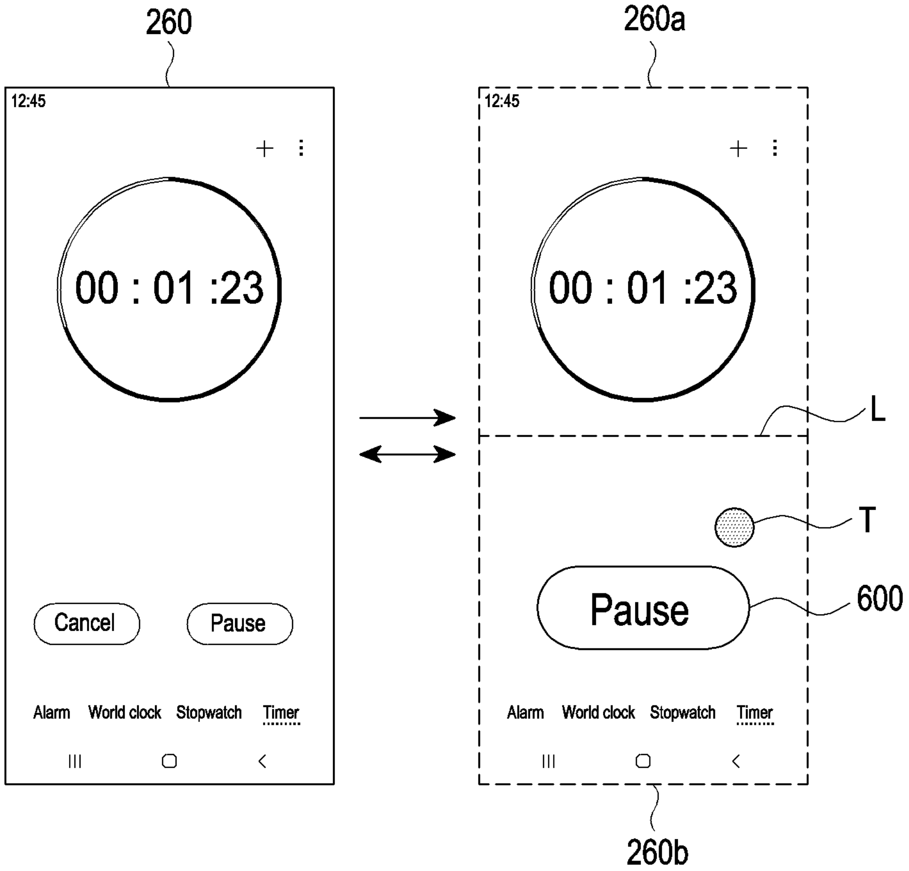
FIG. 6A illustrates a screen of a timer application according to an embodiment of the disclosure.
Figure 6B:
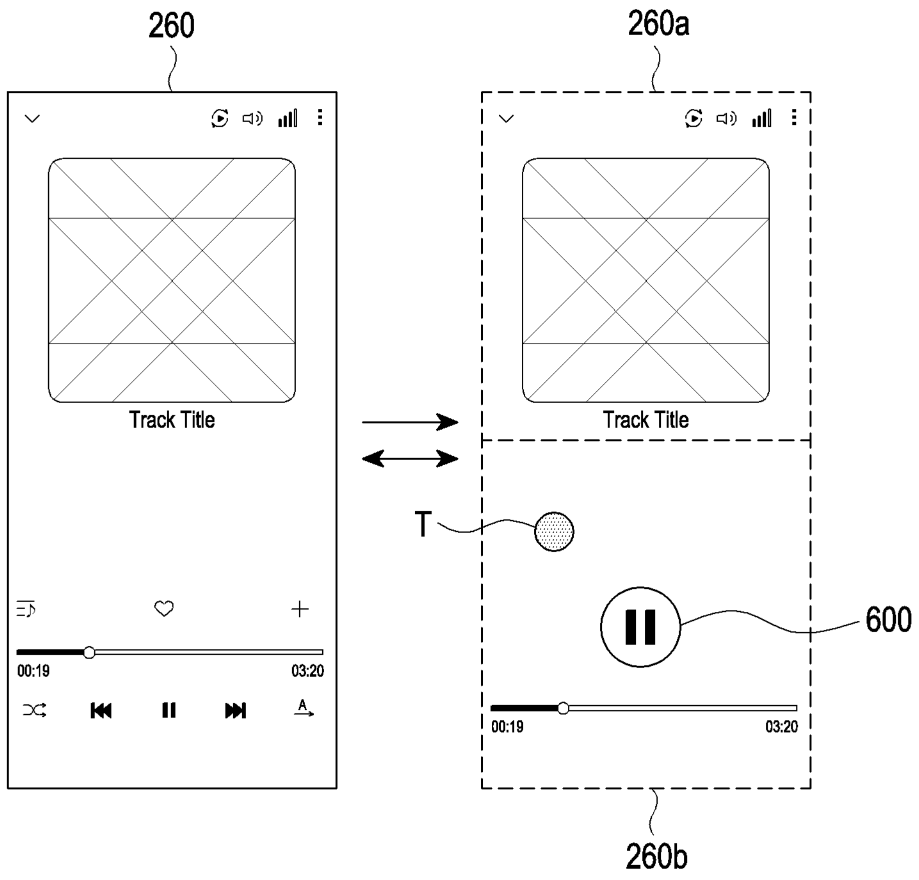
FIG. 6B illustrates a screen of a music player application according to an embodiment of the disclosure.

FIG. 6A illustrates a screen of a timer application according to an embodiment of the disclosure. FIG. 6B illustrates a screen of a music player application according to an embodiment of the disclosure.

Referring to FIGS. 6A and 6B, the electronic device (e.g., the electronic device 101 of FIG. 1) may display a screen of the executed application on the display 260. In an embodiment, when a condition related to screen display of the display 260 is met, the electronic device may display a screen related to the content of the executed application in the first area 260*a* and a screen related to manipulation of the application in the second area 260*b*. For example, the condition related to screen display of the display 260 is a condition for controlling the screen displayed on the display 260, such as whether a touch input occurs through the display 260, whether the electronic device 101 is mounted, the folding angle of the display 260, and the illuminance around the display 260. Here, the first area 260*a* and the second area 260*b* included in the display 260 are portions of the display 260 and may be respective areas partitioned by bending of the display 260.

Here, the screen related to the content of the application means a screen displayed on the display 530 in relation to the function of the executed application and may be a screen displaying a video, music, or image, respectively, on the display 530 when the application is a video player application (video player), a music player application (audio player), a streaming application, a gallery application (gallery), or an image viewer application, and a screen displaying a time state, a recording state, or a capturing preview, respectively, on the display 530 when the application is a timer application (timer), a recording application (recorder), or a camera application (photo mode or video mode). In an embodiment, the display 260 may be bent with respect to the hinge axis of the electronic device and may be divided into a first area 260*a* and a second area 260*b* by a line L corresponding to the hinge axis. In an embodiment, the first area 260*a* may be an upper area of the display 260, and the second area 260*b* may be a lower area of the display 260, and vice versa. Here, the upper and lower directions may be changed by the rotation of the electronic device, and accordingly, the first area 260*a* and the second area 260*b* may also be switched with each other.

In an embodiment, the electronic device may display the screen related to the content of the executed application in the first area 260*a* of the display 260. In an embodiment, the electronic device may display content indicating the time on the display 260 when the timer application is executed as shown in FIG. 6A, and may display content related to music being played on the display 260 when the music player application is executed. In an embodiment, when the video player application is executed, the electronic device may display content related to the video screen being played on the display 260.

In an embodiment, the electronic device may display at least a portion of the screen related to manipulation of the executed application or the screen related to content displayed in the first area 260*a* in the second area 260*b* of the display 260. In an embodiment, when the condition related to screen display of the display 260 is met, the electronic device may display the screen related to manipulation of the executed application in the second area 260*b* of the display 260. In an embodiment, when the condition related to screen display of the display 260 is not met, or a touch input T is generated in the second area 260*b* except for the controller 600, the electronic device may display at least a portion of the screen related to content displayed in the first area 260*a* in the second area 260*b* of the display 260.

In an embodiment, the screen related to the manipulation may include a controller 600 related to a main function corresponding to the application. In an embodiment, the screen related to manipulation of the executed application may be a screen in which only the controller 600 for receiving a touch input to the main function is displayed. Here, the screen related to manipulation of the application and the controller 600 displayed in the second area 260*b* may be set for each specific application, and may be a button related to manipulation of the main function of the application. In an embodiment, the controller 600 included in the screen related to manipulation of the application displayed in the second area 260*b* may be at least one of the controllers included in the screen displayed on the display 260 by the executed application, and may be set by the user or the UE, or a controller frequently used by the user in the application may be selected. In an embodiment, the controller 600 included in the screen related to manipulation of the application displayed in the second area 260*b* may differ in display (e.g., size, color, and position) and the pre-change state from the controller displayed on the display 260 by the executed application.

In an embodiment, the application may be an application in which active/inactive of the main function are clearly distinguished. For example, the application may be one in which the main function is activated by start or play, or the main function is deactivated by pause or stop. In an embodiment, the application may be an application (e.g., media playback or video shooting) in which no additional manipulation is required or no manipulation is input for a relatively long time in a state in which the main function is executed. In an embodiment, the application may be an application (e.g., music player) that is used as an auxiliary in a state in which an application having a different main function is executed.

In an embodiment, the controller 600 may be preset corresponding to the application or the main function of the application. In an embodiment, the controller 600 may be set based on the user's use history corresponding to the main function of the application. For example, the controller 600 may be set to correspond to a specific function with the highest frequency of use by the user in the executed state of a specific application, or may be set to correspond to a specific function most recently used by the user.

FIGS. 7A, 7B, 7C, and 7D illustrates a screen displayed on a display 260 in various contexts according to an embodiment of the disclosure.

Figures 7A, 7B, 7C, 7D:
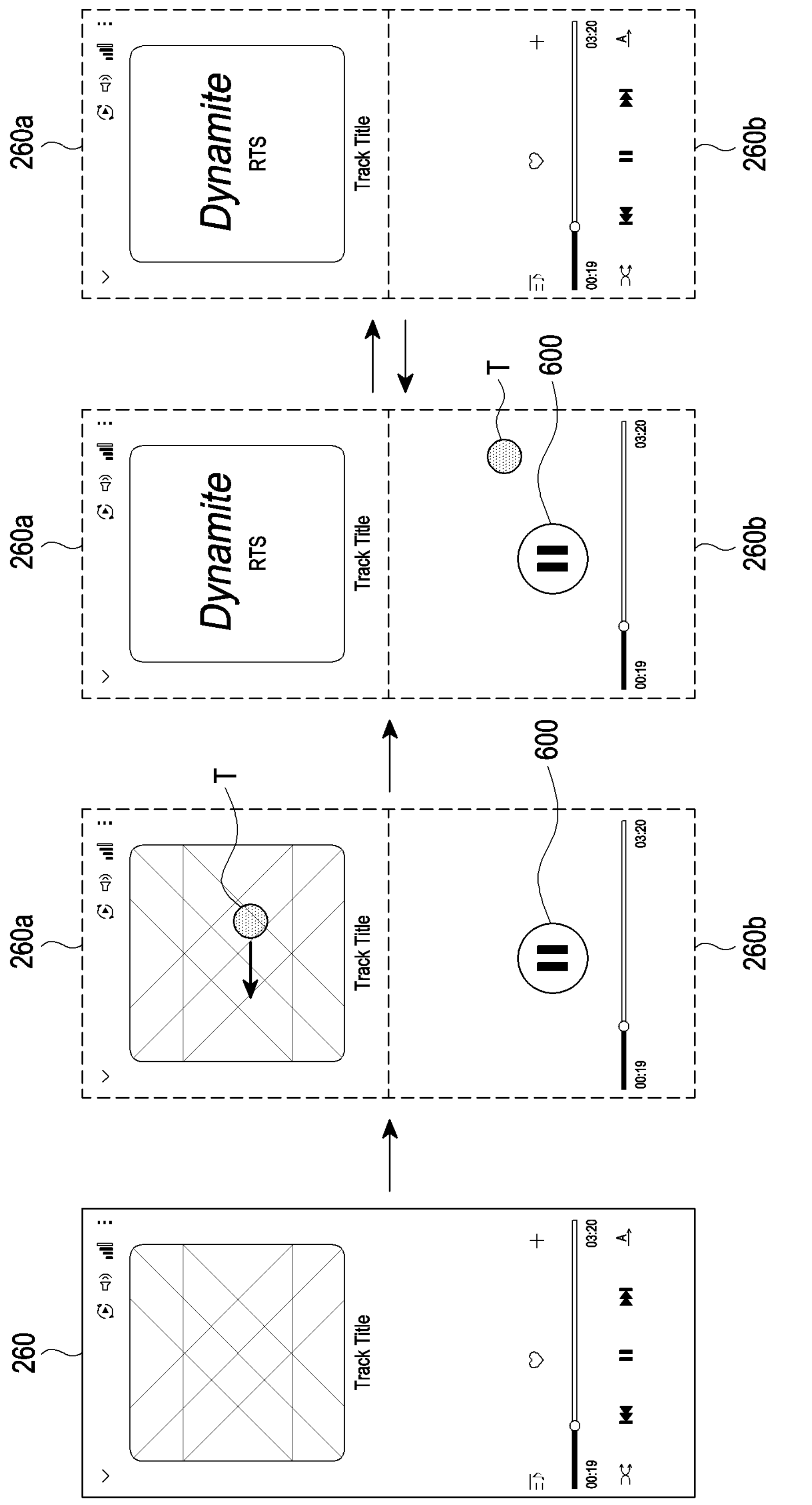
FIGS. 7A, 7B, 7C, and 7D illustrate a screen displayed on a display in various contexts according to an embodiment of the disclosure.

Here, dividing and displaying the display 260 into the first area 260*a* and/or the second area 260*b* or displaying the whole display 260 does not mean that the display 260 is in a folded state or an unfolded state, but means an area in which the display 260 may be divided by folding, and without being limited to a folded state or an unfolded state, either way is possible. Referring to FIGS. 7A-7D, the electronic device (e.g., the electronic device 101 of FIG. 1) may display a screen of an executed application on the entire display 260 as shown in FIG. 7A. Here, the screen of the application may include a controller 600 for a specific function of the application.

In an embodiment, when a condition related to screen display of the display 260 is met, the electronic device may display the screen related to the content of the executed application in the first area 260*a* and the screen related to manipulation of the application in the second area 260*b*, as shown in FIG. 7B.

In an embodiment, when the executed application or content is changed, the electronic device may switch the screen related to manipulation of the application to correspond to the changed application or content. In an embodiment, the executed application or content may be changed by a touch input T such as the user's swipe.

In an embodiment, even if the content of the executed application is changed, if the content is of the same type or is content having the same main function or manipulation method, the electronic device may maintain the screen related to manipulation of the application in the second area 260*b* while changing the screen related to the content of the application in the first area 260*a*, as shown in FIG. 7C. Here, the executed application or content may be changed by the user's touch input (T, e.g., a swipe input) to the first area 260*a* in which the screen related to the content of the application is displayed.

In an embodiment, when the satisfaction of the condition related to screen display of the display 260 is released or a first input T is received from the user (e.g., a touch input T to a portion of the second area 260*b* that displays the screen related to manipulation of the application except for the controller 600), the electronic device may display at least a portion of the content-related screen in the second area 260*b* as shown in FIG. 7D. For example, the electronic device may switch to display the existing screen of the executed application, which was displayed in the second area 260*b* of the display 260, before meeting the condition related to screen display of the display 260. In an embodiment, when at least one of the conditions related to screen display of the display 260 (e.g., conditions such as whether a touch input occurs through the display 260, whether the electronic device 101 is mounted, the folding angle of the display 260, and the illuminance around the display 260) is changed, the electronic device may determine that the satisfaction of the condition related to screen display of the display 260 is released.

In an embodiment, when the condition related to screen display of the display 260 is met again, the electronic device may switch to display the screen related to operation of the application in the second area 260*b* as shown in FIG. 7C. In an embodiment, when the electronic device is changed to meet all the necessary conditions of the conditions related to screen display of the display 260 (e.g., conditions such as whether a touch input occurs through the display 260, whether the electronic device 101 is mounted, the folding angle of the display 260, and the illuminance around the display 260), the electronic device may determine that the condition related to screen display of the display 260 is met again.

Figure 8A:
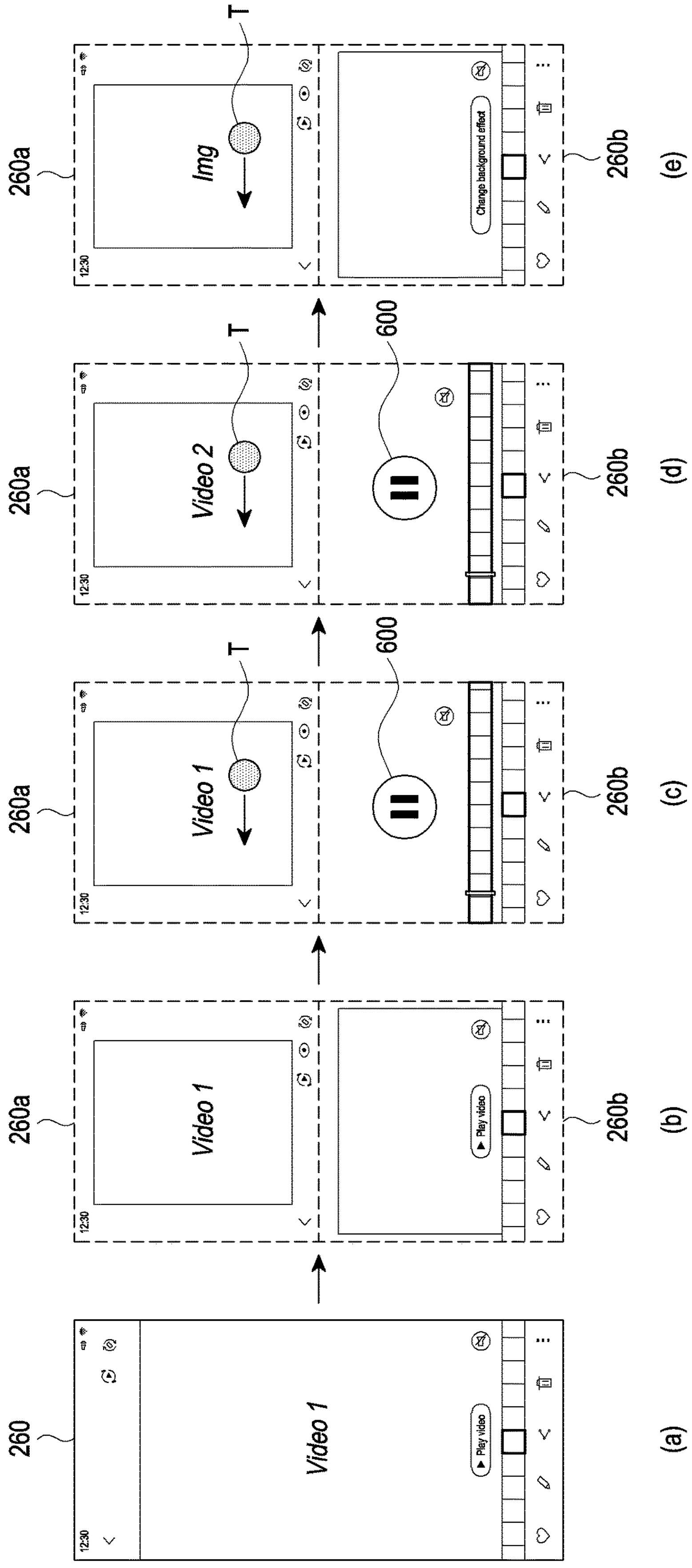
FIGS. 8A and 8B illustrate a screen displayed on a display in various contexts according to various embodiments of the disclosure.
Figure 8B:
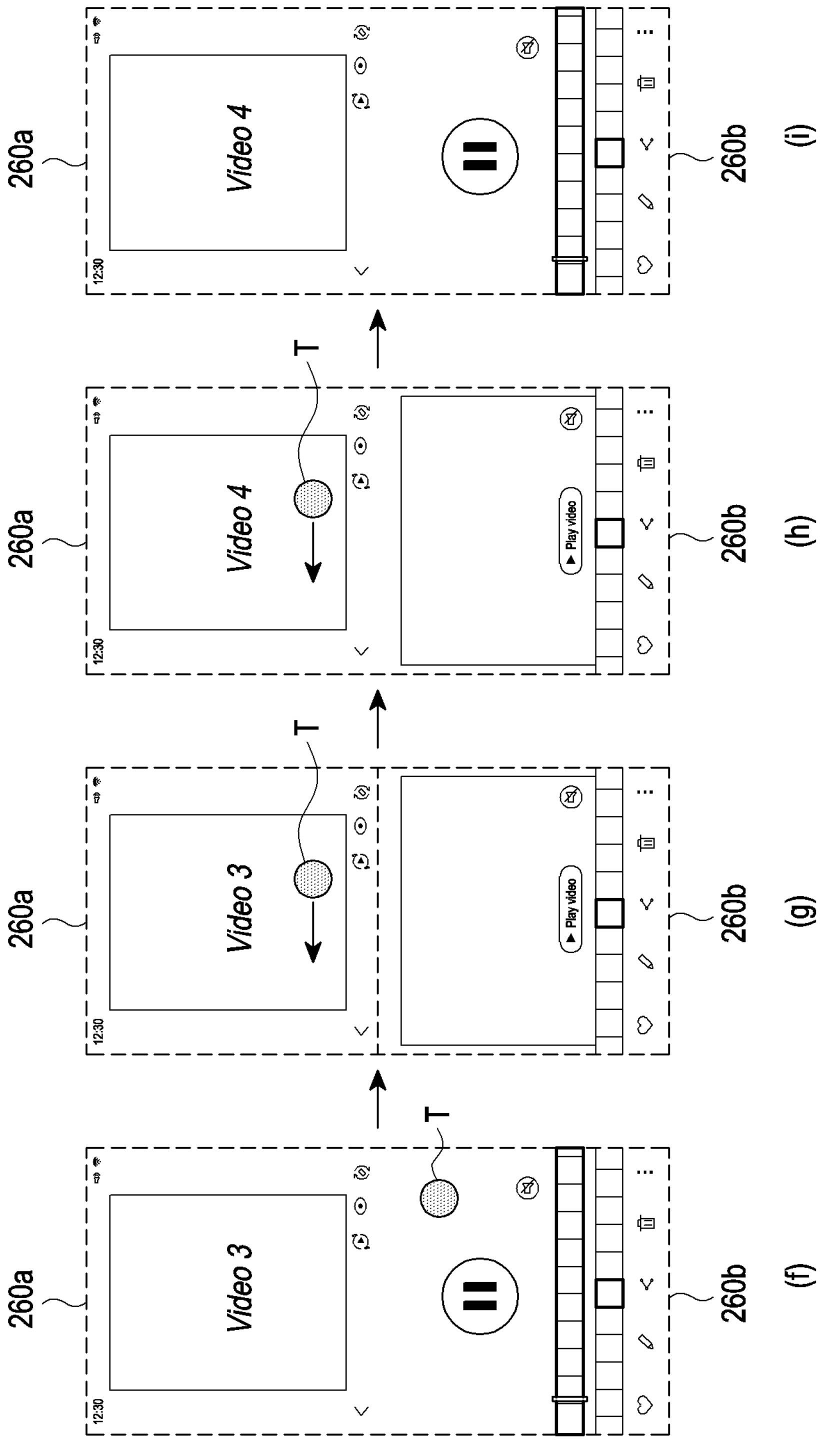
Figures 9A, 9B, 9C, 9D, 9E:
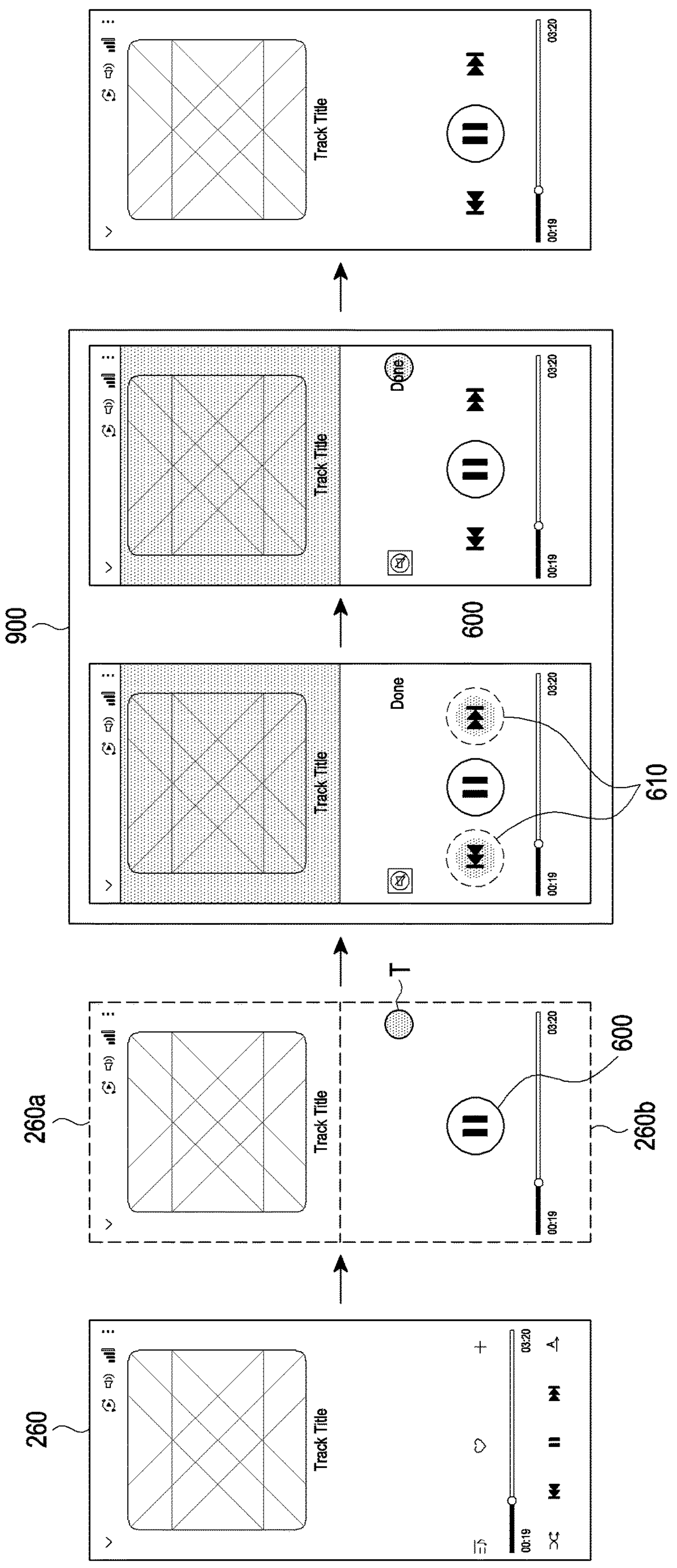
FIGS. 9A, 9B, 9C, 9D, and 9E illustrate a process of displaying an edit screen capable of editing a controller included in a screen related to manipulation according to an embodiment of the disclosure.

FIGS. 8A and 8B illustrate a screen displayed on a display 260 in various contexts according to various embodiments of the disclosure.

Referring to FIGS. 8A and 8B, the electronic device (e.g., the electronic device 101 of FIG. 1) may display the screen of the executed application on the entire display 260 as shown in part (a) of FIG. 8A.

In an embodiment, when the display 260 is in a folded fold state, which is some of the conditions related to screen display of the display 260, the electronic device may display a screen of a flex mode displaying a touch pad capable of receiving the user's touch input in the second area 260*b*, as shown in part (b) of FIG. 8A.

In an embodiment, when the condition related to screen display of the display 260 is met, the electronic device may display the screen related to manipulation of the application in the second area 260*b* as shown in part (c) of FIG. 8A.

In an embodiment, the electronic device may change the executed application or content, as shown in parts (d) and (e) of FIG. 8A, by the user's input (T, e.g., a swipe input) to the first area 260*a* in which the screen related to the content of the application is displayed. In an embodiment, as shown in part (d) of FIG. 8A, when the changed content is of the same type (e.g., video), the electronic device may maintain the screen related to manipulation of the application displayed in the second area 260*b*. In an embodiment, as shown in part (e) of FIG. 8A, when the changed content is of a different type (e.g., an image), the electronic device may switch to the screen related to manipulation corresponding to the changed application or content. In an embodiment, when the screen related to manipulation corresponding to the changed application or content is not preset, a screen of a flex mode displaying a touch pad capable of receiving the user's touch input may be displayed in the second area 260*b*.

In an embodiment, as shown in part (f) of FIG. 8B, when the changed content is of a different type (e.g., video), the electronic device may switch to the screen related to manipulation corresponding to the changed application or content.

In an embodiment, when receiving a first input T from the user while displaying the screen related to content in the first area 260*a* and the screen related to manipulation in the second area 260*b* (e.g., a touch input T to a portion of the second area 260*b* displaying the screen related to manipulation of the application except for the controller 600), as shown in part (g) of FIG. 8B, the electronic device may display a screen of a flex mode displaying a touch pad capable of receiving the user's touch input in the second area 260*b*.

In an embodiment, when the executed application or content is changed by the user's touch input (T, e.g., a swipe input) to the first area 260*a* in which the screen related to the content of the application is displayed, the electronic device may change the screen related to the content of the application displayed in the first area 260*a* while maintaining the screen of the flex mode displaying a touch pad capable of receiving the user's touch input in the second area 260*b*, as shown in part (h) of FIG. 8B. In an embodiment, the electronic device may maintain the screen of the flex mode as shown in part (h) of FIG. 8B, even if the condition related to screen display of the display 260 is continuously met.

In an embodiment, when the satisfaction of the condition related to screen display of the display 260 is released and then the condition related to screen display of the display 260 is met again, the electronic device may display the screen related to manipulation of the application in the second area 260*b* as shown in part (i) of FIG. 8B.

FIGS. 9A, 9B, 9C, 9D, and 9E illustrate a process of displaying an edit screen 900 capable of editing a controller 600 included in a screen related to manipulation according to an embodiment of the disclosure.

Referring to FIGS. 9A-9E, when the electronic device (e.g., the electronic device 101 of FIG. 1) receives a second input (T) (e.g., a long press input (T) to the second area 260*b* except for the controller 600 displayed on the manipulation-related screen) from the user while displaying the content-related screen in the first area 260*a* and the manipulation-related screen in the second area 260*b*, the electronic device may display an edit screen 900 capable of editing the controller 600 included in the manipulation-related screen in the second area 260*b*.

In an embodiment, the electronic device may display an edit screen 900 capable of editing the screen related to manipulation displayed in the second area 260*b* in the second area 260*b* by receiving a preset second input T.

In an embodiment, the electronic device may change the activation/deactivation of the corresponding controller 610 by the user's touch input T related to at least one controller 600 and 610 on the edit screen 900. For example, the electronic device may activate or deactivate the controller 610 on the screen related to manipulation displayed in the second area 260*b* based on the user's tap or long press input to at least one of the plurality of selectable controllers 600 and 610. In an embodiment, the electronic device may maintain the controller 600 corresponding to the essential manipulation of the main function among the controllers 600 and 610 corresponding to the main function of the application in an active state, and may change activation/deactivation of the controller 610 corresponding to the incidental manipulation of the main function based on the user's touch input T.

In an embodiment, the electronic device may terminate the edit screen 900 by the user's input, and may display the controllers 600 and 610 activated on the edit screen 900 on the screen related to manipulation of displaying the controllers 600 and 610 in the second area 260*b*. In an embodiment, the electronic device may terminate the edit screen 900 by a tap input of a button (done) corresponding to completion of editing.

Figure 10A:
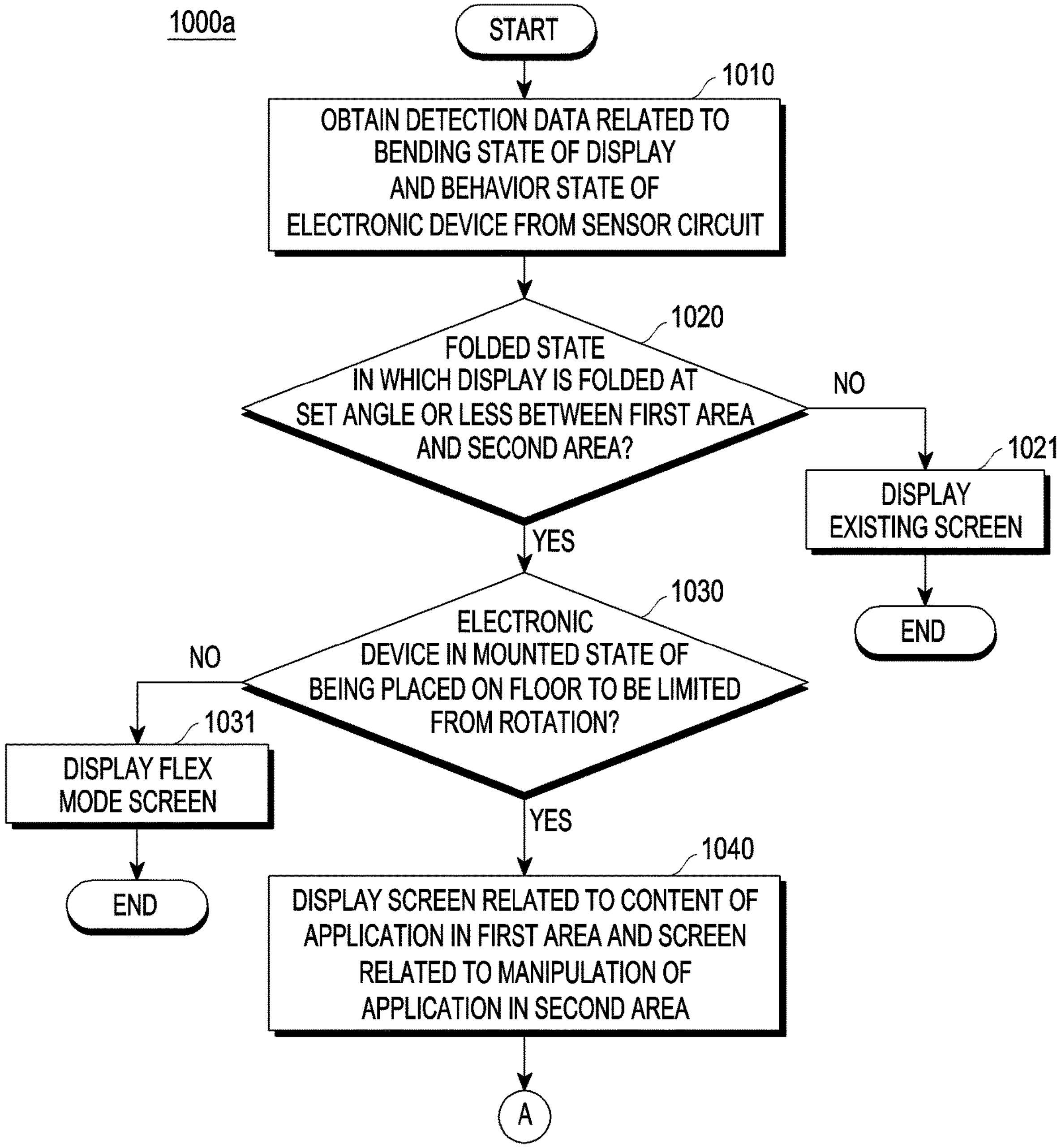
FIGS. 10A and 10B are flowcharts illustrating a method for operating an electronic device according to various embodiments of the disclosure.
Figure 10B:
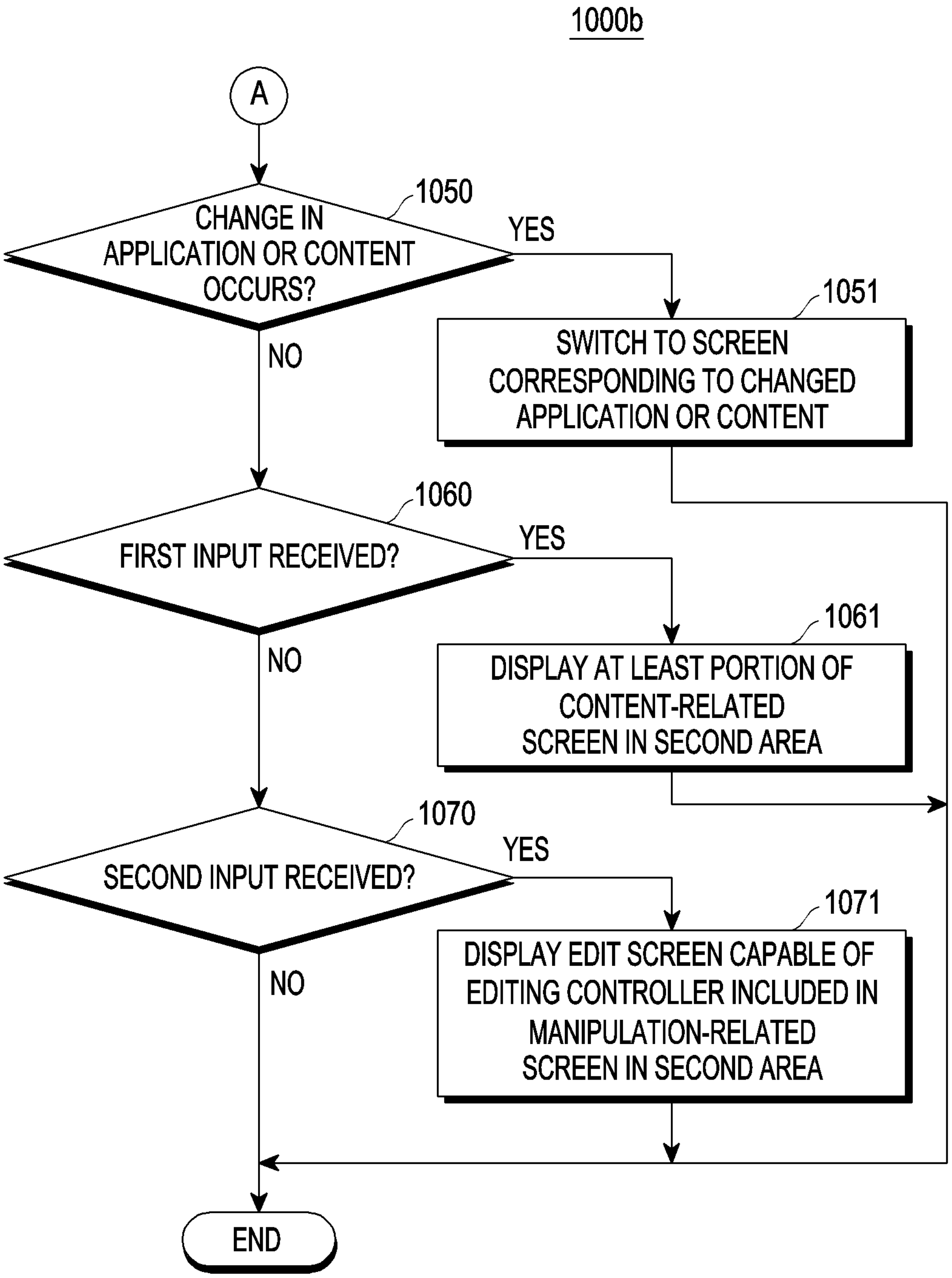

FIGS. 10A and 10B are flowcharts 1000*a* and 1000*b* illustrating a method for operating an electronic device according to various embodiments of the disclosure.

Referring to FIGS. 10A and 10B, in operation 1010, the electronic device may obtain detection data related to a bending state of the display and a behavior state of the electronic device from a sensor circuit. In an embodiment, the electronic device may receive, from the sensor circuit, the strength of the magnetic field related to the bending state of the display or the gravity direction related to the behavior state of the electronic device.

In an embodiment, in operations 1020 and 1030, the electronic device may determine whether the condition related to screen display of the display is met based on the obtained detection data.

In an embodiment, in operation 1020, the electronic device may determine whether the display is in a folded state in which the angle between the first area and the second area of the display is a set angle or less. In an embodiment, in operation 1021, when the display is not in the folded state, the electronic device may display the screen (e.g., a full screen of the executed application) that has been previously displayed on the display.

In an embodiment, in operation 1030, the electronic device may determine whether the electronic device is in a mounted state of being placed on the floor to be limited from rotation. In an embodiment, in operation 1031, when the electronic device is not in the mounted state, the electronic device may display a flex mode screen displaying a touch pad capable of receiving the user's touch input in the second area.

In an embodiment, when the condition related to screen display of the display is met, in operation 1040, the electronic device may display the screen related to the content of the executed application in the first area and the screen related to manipulation of the application in the second area.

In an embodiment, in operation 1050, the electronic device may determine whether a change occurs in the executed application, or whether a change in content occurs according to the execution of the application. In an embodiment, when a change occurs in the application or content, the electronic device may switch to a screen corresponding to the changed application or content in operation 1051. In an embodiment, when the screen corresponding to the changed application or content is the same as before, the electronic device may maintain the previously displayed screen.

According to an embodiment, in operation 1060, the electronic device may determine whether a set first input is received from the user. In an embodiment, when receiving the first input, in operation 1061, the electronic device may display at least a portion of the screen related to the content in the second area. In an embodiment, the electronic device may display at least a portion of the screen related to the content displayed in the first area in the second area.

According to an embodiment, in operation 1070, the electronic device may determine whether a set second input is received from the user. In an embodiment, when receiving the second input, the electronic device may display an edit screen in operation 1071 that is capable of editing a controller included in the screen related to manipulation of the application displayed in the second area in the second area. In an embodiment, when the edit screen is terminated, the electronic device may display the screen related to manipulation of the application including the controller reflecting editing on the edit screen in the second area.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

An electronic device 101 according to an embodiment of the disclosure may comprise a display 260; 530 bendable to be divided into a first area 260*a* and a second area 260*b*, a sensor circuit 176; 570 generating detection data related to a bending state of the display 260; 530 and a behavior state of the electronic device 101, and at least one processor 120; 510 operatively connected to the display 260; 530 and the sensor circuit 176; 570. The at least one processor 120; 510 may be configured to obtain the generated detection data related to the bending state of the display 260; 530 and the behavior state of the electronic device 101 from the sensor circuit 176; 570. The at least one processor 120; 510 may be configured to determine whether a condition related to screen display of the display 260; 530 is met, based on the obtained detection data. The at least one processor 120; 510 may be configured to display a screen related to a content of an executed application in the first area 260*a* and a screen related to manipulation of the application in the second area 260*b* when the condition is met.

In the electronic device 101 according to an embodiment, the at least one processor 120; 510 may be configured to, as at least part of determining whether the condition is met, determine whether the display 260; 530 is in a folded state in which an angle between the first area 260*a* and the second area 260*b* is a set angle or less.

In the electronic device 101 according to an embodiment, the at least one processor 120; 510 may be configured to, as at least part of determining whether the condition is met, determine whether the electronic device 101 is in a mounted state of being placed on a floor to be limited from rotation.

In the electronic device 101 according to an embodiment, the at least one processor 120; 510 may be configured to, as at least part of determining whether the condition is met, determine that the condition is met when the display 260; 530 is in a folded state and the electronic device 101 is in a mounted state.

In the electronic device 101 according to an embodiment, the at least one processor 120; 510 may be configured to, as at least part of obtaining the detection data from the sensor circuit 176; 570, obtain a magnetic field changed according to a bending state of the display 260; 530 or a gravity direction changed according to rotation of the electronic device 101 from the sensor circuit 176; 570.

In the electronic device 101 according to an embodiment, a controller 600 related to a main function corresponding to the application may be included in the screen related to the manipulation.

In the electronic device 101 according to an embodiment, the controller 600 may be preset corresponding to the application or may be set based on a use history of a user corresponding to the main function.

In the electronic device 101 according to an embodiment, the at least one processor 120; 510 may be configured to, when the application or the content is changed in a state of displaying the screen related to the content in the first area 260*a* and the screen related to the manipulation in the second area 260*b*, switch to a screen corresponding to the changed application or content.

In the electronic device 101 according to an embodiment, the at least one processor 120; 510 may be configured to display at least a portion of the screen related to the content in the second area 260*b* when receiving a first input from a user in a state of displaying the screen related to the content in the first area 260*a* and the screen related to the manipulation in the second area 260*b*.

In the electronic device 101 according to an embodiment, the at least one processor 120; 510 may be configured to display an edit screen capable of editing a controller 600 included in the screen related to the manipulation when receiving a second input from a user in a state of displaying the screen related to the content in the first area 260*a* and the screen related to the manipulation in the second area 260*b*.

A method for operating an electronic device 101 according to an embodiment of the disclosure may comprise obtaining detection data related to a bending state of a display 260; 530 bendable to be divided into a first area 260*a* and a second area 260*b* and a behavior state of the electronic device 101 from a sensor circuit 176; 570. The method for operating the electronic device 101 according to an embodiment may comprise determining whether a condition related to screen display of the display 260; 530 is met, based on the obtained detection data. The method for operating the electronic device 101 according to an embodiment may comprise displaying a screen related to a content of an executed application in the first area 260*a* and a screen related to manipulation of the application in the second area 260*b* when the condition is met.

In the method for operating the electronic device 101 according to an embodiment, determining whether the condition is met may include determining 1020 whether the display 260; 530 is in a folded state in which an angle between the first area 260*a* and the second area 260*b* is a set angle or less.

In the method for operating the electronic device 101 according to an embodiment, determining whether the condition is met may include determining 1030 whether the electronic device 101 is in a mounted state of being placed on a floor to be limited from rotation.

In the method for operating the electronic device 101 according to an embodiment, determining whether the condition is met may include determining that the condition is met when the display 260; 530 is in a folded state and the electronic device 101 is in a mounted state.

In the method for operating the electronic device 101 according to an embodiment, obtaining the detection data from the sensor circuit 176; 570 may include obtaining a magnetic field changed according to a bending state of the display 260; 530 or a gravity direction changed according to rotation of the electronic device 101 from the sensor circuit 176; 570.

In the method for operating the electronic device 101 according to an embodiment, a controller 600 related to a main function corresponding to the application may be included in the screen related to the manipulation.

In the method for operating the electronic device 101 according to an embodiment, the controller 600 may be preset corresponding to the application or may be set based on a use history of a user corresponding to the main function.

The method for operating the electronic device 101 according to an embodiment may further comprise, in a state of displaying the screen related to the content in the first area 260*a* and the screen related to the manipulation in the second area 260*b*, switching to a screen corresponding to the changed application or content.

The method for operating the electronic device 101 according to an embodiment may further comprise displaying at least a portion of the screen related to the content in the second area 260*b* when receiving a first input from a user in a state of displaying the screen related to the content in the first area 260*a* and the screen related to the manipulation in the second area 260*b*.

The method for operating the electronic device 101 according to an embodiment may further comprise displaying an edit screen capable of editing a controller 600 included in the screen related to the manipulation when receiving a second input from a user in a state of displaying the screen related to the content in the first area 260*a* and the screen related to the manipulation in the second area 260*b*.

A non-transitory computer-readable storage medium storing one or more programs according to an embodiment of the disclosure may comprise obtaining detection data related to a bending state of a display 260; 530 bendable to be divided into a first area 260*a* and a second area 260*b* and a behavior state of the electronic device 101 from a sensor circuit 176; 570. The storage medium according to an embodiment may comprise determining whether a condition related to screen display of the display 260; 530 is met, based on the obtained detection data. The storage medium according to an embodiment may comprise displaying a screen related to a content of an executed application in the first area 260*a* and a screen related to manipulation of the application in the second area 260*b* when the condition is met.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

a display;

a hinge structure configured to be folded or unfolded;

a first sensor configured to generate first detection data related to a folding angle of the display;

a second sensor configured to generate second detection data related to a behavior state of the electronic device;

memory storing one or more computer programs; and one or more processors communicatively coupled to the display, the first sensor, the second sensor, and the memory, wherein the one or more computer programs include computer-executable instructions that, when executed by the one or more processors individually or collectively, cause the electronic device to:

display, on the display, a first screen including first content while the electronic device is in a first state, obtain the first detection data related to the folding angle of the display from the first sensor, obtain the second detection data related to the behavior state of the electronic device from the second sensor, determine whether the electronic device is in a flexed state, based on the first detection data and the second detection data, and based on determining that the electronic device is in the flexed state, display a second screen including the first content in a first area of the display and at least one visual object for manipulating the first content in a second area of the display, wherein the first area and the second area are divided based on the hinge structure.

2. The electronic device of claim 1, wherein the one or more computer programs further include computer-executable instructions that, when executed by the one or more processors individually or collectively, cause the electronic device to, for determining whether the electronic device is in the flexed state, determine whether the display is in a folded state in which an angle between the first area and the second area is a set angle or less.

3. The electronic device of claim 1, wherein the one or more computer programs further include computer-executable instructions that, when executed by the one or more processors individually or collectively, cause the electronic device to, for determining whether the electronic device is in the flexed state, determine whether the electronic device is in a mounted state of being placed on a surface.

4. The electronic device of claim 1, wherein the one or more computer programs further include computer-executable instructions that, when executed by the one or more processors individually or collectively, cause the electronic device to determine that the electronic device is in the flexed state when the display is in a folded state and the electronic device is in a mounted state.

5. The electronic device of claim 1, wherein the one or more computer programs further include computer-executable instructions that, when executed by the one or more processors individually or collectively, cause the electronic device to obtain the first detection data including a magnetic field changed according to a bending state of the display from the first sensor or the second detection data including a gravity direction changed according to rotation of the electronic device from the second sensor.

6. The electronic device of claim 1, wherein a controller related to a main function corresponding to the first content is included in the second screen related to manipulation of the first content.

7. The electronic device of claim 6, wherein the controller is preset corresponding to an application or is set based on a use history of a user corresponding to the main function.

8. The electronic device of claim 1, wherein the one or more computer programs further include computer-executable instructions that, when executed by the one or more processors individually or collectively, cause the electronic device to, when an application or the first content is changed in a state of displaying the first screen related to the first content in the first area and the second screen related to the manipulation of the first content in the second area, switch to a screen corresponding to the changed application or changed content.

9. The electronic device of claim 1, wherein the one or more computer programs further include computer-executable instructions that, when executed by the one or more processors individually or collectively, cause the electronic device to display at least a portion of the first screen related to the first content in the second area when receiving a first input from a user in a state of displaying the first screen related to the first content in the first area and the second screen related to the manipulation in the second area.

10. The electronic device of claim 1, wherein the one or more computer programs further include computer-executable instructions that, when executed by the one or more processors individually or collectively, cause the electronic device to display an edit screen capable of editing a controller included in the second screen related to the manipulation when receiving a second input from a user in a state of displaying the first screen related to the first content in the first area and the second screen related to the manipulation in the second area.

11. A method for operating an electronic device, the method comprising:

displaying, on a display of the electronic device, a first screen including first content while the electronic device is in a first state, obtaining first detection data related to a folding angle of the display from a first sensor and second detection data related to a behavior state of the electronic device from a second sensor;

determining whether the electronic device is in a flexed state, based on the first detection data and the second detection data; and based on determining that the electronic device is in the flexed state, displaying a second screen including the first content in a first area of the display and at least one visual object for manipulating the first content in a second area of the display, wherein the first area and the second area are divided based on a hinge structure of the electronic device.

12. The method of claim 11, wherein determining whether the electronic device is in the flexed state includes determining whether the display is in a folded state in which an angle between the first area and the second area is a set angle or less.

13. The method of claim 11, wherein determining whether the electronic device is in the flexed state includes determining whether the electronic device is in a mounted state of being placed on a surface.

14. The method of claim 11, wherein determining whether the electronic device is in the flexed state includes determining that the electronic device is in the flexed state when the display is in a folded state and the electronic device is in a mounted state.

15. The method of claim 11, wherein obtaining the first detection data and second detection data includes obtaining the first detection data including a magnetic field changed according to a bending state of the display from the first sensor or the second detection data including a gravity direction changed according to rotation of the electronic device from the second sensor.

16. The method of claim 11, wherein a controller related to a main function corresponding to the first content is included in the second screen related to the manipulation.

17. The method of claim 16, wherein the controller is preset corresponding to an application or is set based on a use history of a user corresponding to the main function.

18. The method of claim 11, further comprising when an application or the first content is changed in a state of displaying the first screen related to the first content in the first area and the second screen related to the manipulation in the second area, switching to a screen corresponding to the changed application or content.

19. One or more non-transitory computer-readable storage media storing one or more computer programs including computer-executable instructions that, when executed by one or more processors of an electronic device individually or collectively, cause the electronic device to perform operations, the operations comprising:

displaying, on a display, a first screen including first content while the electronic device is in a first state, obtaining first detection data related to a folding angle of the display from a first sensor and second detection data related to a behavior state of the electronic device from a second sensor;

determining whether the electronic device is in a flexed state, based on the first detection data and the second detection data; and based on determining that the electronic device is in the flexed state, displaying a second screen including the first content in a first area of the display and at least one visual object for manipulating the first content in a second area of the display, wherein the first area and the second area are divided based on a hinge structure of the electronic device.

20. The one or more non-transitory computer-readable storage media of claim 19, the operations further comprising when an application or the first content is changed in a state of displaying the first screen related to the first content in the first area and the second screen related to the manipulation in the second area, switching to a screen corresponding to the changed application or content.

21. The electronic device of claim 6, wherein the controller related to the main function includes a controller that was displayed on a same screen as the first content prior to folding of the display, and wherein display of the controller, after the folding of the display, differs in at least one of size, color, or position, from the display of the controller prior to the folding of the display.

22. The electronic device of claim 1, wherein the behavior state includes one of a mounted state, a moving state, a rotating state, or a gripping state.

* * * * *